July 18, 1944.   W. N. STONE   2,353,974
SCALE
Filed March 18, 1943
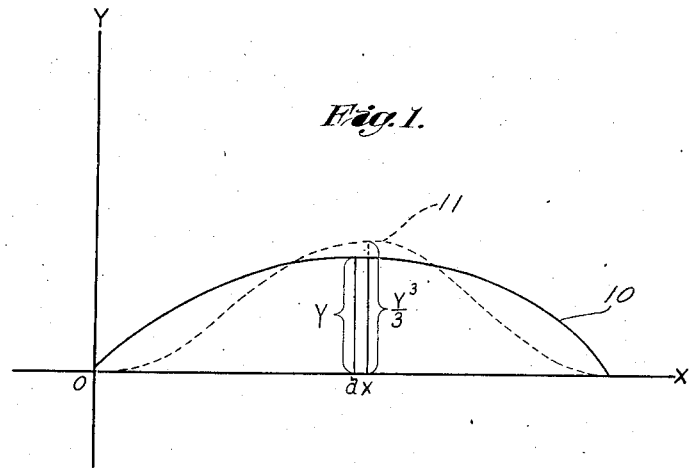
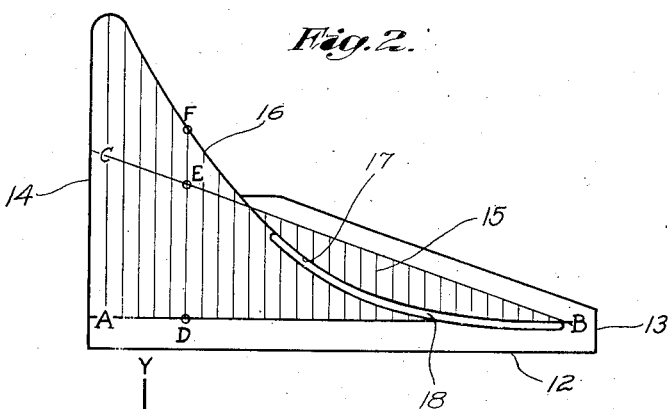
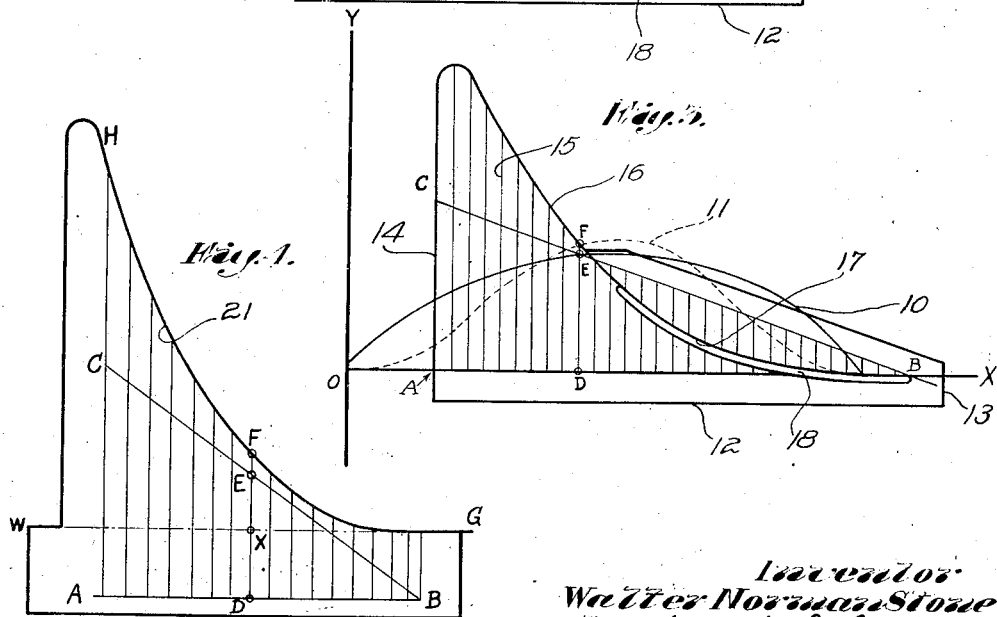
Inventor
Walter Norman Stone
By Charles L. Shelton
Attorney Patented July 18, 1944

2,353,974

UNITED STATES PATENT OFFICE 2,353,974

SCALE

Walter Norman Stone, Glastonbury, Conn., assignor to United Aircraft Corporation, East Hartford, Conn., a corporation of Delaware Application March 18, 1943, Serial No. 479,613

7 Claims. (Cl. 33—75)

This invention relates to an instrument or scale primarily adapted for use in graphically determining moments of inertia of an area or shape about a base. More particularly the invention relates to a member of irregular outline formed preferably from transparent sheet material having a base line indicated thereon and having one of its boundary edges laid out upon a curve in accordance with a mathematical formula.

A primary object of the invention is to provide draftsmen with an instrument or scale to facilitate calculations of moments of inertia, "moments of area" and other functions of a plane figure.

Another object of the invention is to provide a member preferably formed from a sheet of transparent material having a base line thereon, a line drawn oblique thereto, and a limiting edge or curved boundary the distance of any point therein from the base line being either proportional to or equal to a distance calculated by a formula, such as $$Y = \frac{Y^3}{3} \text{ or } = \frac{Y^2}{2}$$

where Y is a distance between the oblique and base lines, these distances being measured on normals to the base line.

A feature of the present invention which enables me to accomplish the above-named object in determining moments of inertia or other functions of an area is that a sheet of transparent material of convenient size is provided with a base line adjacent and preferably parallel to one edge and with an oblique line preferably intersecting the base line near one end, there being a boundary edge on the figure so determined that any point therein is distant from the base line, in a line drawn normal thereto, a distance proportional or equal to a constant multiplied by a power of the distance between the oblique line and base line, such as the square, cube, or other power of that distance.

Other objects and advantages will be apparent from the specification and claims, and from the drawing which illustrates what are now considered preferred embodiments of the invention.

In the accompanying drawing annexed hereto and forming a part of this specification, I have shown the invention embodied in an irregularly shaped form cut from a sheet of transparent material a portion of the curved boundary conforming to the formula $$Y = \frac{Y^3}{3}$$

In the drawing,

Fig. 1 shows, in full lines, an outline or irregular area the moment of inertia of which is to be determined about its base, the moment of inertia of this area about its base being represented by the area within the broken line and base line.

Fig. 2 is one form of the instrument or scale made in accordance with the present invention.

Fig. 3 is a view showing the instrument or scale illustrated in Fig. 2 applied to a shape or area the moment of inertia of which is to be determined about its base and, Fig. 4 is a modified form of the instrument.

In the above mentioned drawing only two embodiments of the invention are shown, but it is to be understood that changes and modifications may be made therein without departing from the spirit of the invention.

Briefly, and in its preferred aspect, the invention may include the following principal parts: First, a member preferably of transparent sheet material having an outline generally similar to those shown in Figs. 2 and 4; second, a base line scribed thereon adjacent and preferably parallel to one of the edges thereof; third, a line drawn oblique to said base line; and fourth, a curved boundary edge conforming to a predetermined formula and determined by exponential functions of the distances between the oblique and base lines in normals to the base line at varying points along their length.

Referring more in detail to the figures of the drawing, let it be assumed that the moment of inertia of the area or figure within curve 10 shown in full lines in Fig. 1 is to be determined about the line OX forming the base of the area. The formula for finding the moment of inertia of any area about its base is $$\int_0^a \frac{Y^3}{3} dx$$

in which Y equals the distance of any point in the outline of the area from the base line or axis. This formula is true for the reason that the moment of inertia of a rectangle about a base $dx$ (see Fig. 1) is equal to $$\frac{Y^3}{3} dx$$

Therefore if a rectangle were constructed with one side equal to $$\frac{Y^3}{3}$$

and the base equal to $dx$, the area of this rectangle would be equal to the moment of inertia of the original shape $Ydx$. The moment of inertia of the entire area within the outline 10 and the base OX will be the summation of all these values. In other words the moment of inertia of the area within curve 10 about its base OX will be the area of the figure within dotted outline 11 where each point in outline 11 is obtained as above described. The resulting curve by plotting values of $$\frac{Y^3}{3}$$

at closely adjacent points along the boundary line 10 is indicated in the dotted outline 11 in Figs. 1 and 3. Each point in the curve 11 is distant from the base line OX an amount proportional to or equal to one-third of the cube of the distance between the outline 10 or 19 and the base line OX.

Referring now to Fig. 2, which shows one conventional form assumed by the scale or instrument forming the present invention, the transparent material may have a convenient outline such as shown, there being a straight base edge 12 and side edges 13 and 14 extending normally thereto. Adjacent the base edge 12 of this scale is a base line AB drawn for convenience parallel to the base edge 12. Extending obliquely to said base line AB is oblique line BC. In the embodiment of the invention shown in this figure line BC intersects line AB at B adjacent one edge of the instrument. The base line AB at equidistant points may have normals 15 drawn therefrom as indicated and extending to the curved periphery 16 of the figure. The above referred to lines AB, BC and the normals 15 may be suitably scribed or otherwise indicated on the material forming the scale. The upper or curved boundary edge 16 of the instrument may have a continuous boundary curve in one form of the invention, but as indicated in Fig. 2 this part of the instrument may have the boundary curve 16 for a part of its length and an extension curve 17 forming the upper edge of a slot 18 therein as indicated. To determine the outline of this curved boundary formed by curves 16 and 17 each point therein is distant from the base line AB a length proportional to the cube of the distance between the base line AB and oblique line BC in a normal drawn from that particular point to the base line. In Fig. 2 the distance FD equals $$\frac{4(ED)^3}{3}$$

The curved boundary 16 and 17 may be laid out by making the height of each successive normal 15 equal to a constant multiplied by the cube of the distance between the base AB and a reference point determined by the intersection of its normal 15 and the oblique line BC.

In order to produce the curve 11 from the curve 10, the instrument is placed over the curve with the line AB of the instrument coinciding with the base OX of the area formed by the curve 10. The instrument is then moved horizontally along the base OX, and wherever a point formed by the intersection of the oblique line BC and a vertical line 15 coincides with a point on the curve 10, a point is established for the curve 11 at the upper end of that particular vertical line. Thus in Figure 3, the instrument has been moved along the base OX for the curve 10 until point E (formed by the intersection of the oblique line BC and the extended vertical line DF) falls on the curve 10. This establishes one point F for the curve 11 at the upper end of the line DF. A smooth curve is then drawn through all of the points so established, such curve being indicated at 11 in Figure 3. The area of this figure enclosed within the dotted line 11 and the base line OX will indicate the moment of inertia for the area within line 10 and the base line shown in full lines in Figs. 1 and 3 when the moment of inertia is taken about its base line OX.

Some instruments may be desired for use over a wide range of areas having widely ranging heights in which the distances between the base line and the curved boundary edge if made equal to one-third the cube of the distance between the oblique and base lines BC and AB would result in the scale becoming too unwieldy for convenient use. In such cases another boundary or resultant curve can be developed for the scale by using the same equation but applying a factor thereto to reduce the height of the instrument. Such a figure is illustrated in Fig. 4. In this form of the invention each point in the curved boundary edge 21 between G and H is distant from the base line GW a length which is one-third the cube of the distance between the oblique line BC and base line AB multiplied a factor such as ½, ⅓, or 1/10, the distances being measured on normals to the lines AB and GW. That is, the length XF equals $$\frac{(DE)^3}{3K}$$

where K is the factor chosen in laying out boundary curve 21.

In using such a scale or instrument the area of the resultant figure obtained by the method referred to above must be multiplied by the reciprocal of the factor used in making that particular scale.

In Fig. 4 the curved slot 18 in the scale shown in Fig. 2 is eliminated by the use of separated base lines AB and GW. AB is the base line for the distances from the base line AB to the oblique line BC but the base line for the curve GH is the line GW which is spaced from the line AB a distance sufficient to place all points in the curve GH outside of the oblique line BC. As shown in Fig. 4 the base lines AB and GW are parallel. In using a scale such as shown in Fig. 4, distances between the base line and the boundary of the area being plotted as to its moment of inertia etc. are taken between the lines AB and BC, one of these distances being indicated by the line DE. In laying out the curve representing the moment of inertia of the area being plotted the distances are taken on the vertical lines between the line GW and the curve 21, this distance for the line DE being indicated by XF.

In the above description the use of the scale to determine moments of inertias of plane figures only has been explained. Other functions of a plane figure may be useful such as the "moment of area" determined by the formula $$S\frac{y^2}{2}dx$$

instead of $$S\frac{y^3}{3}dx$$

It is to be understood that the invention is not limited to the specific embodiments herein illustrated and described, but may be used in other ways without departure from its spirit as defined by the following claims.

I claim:

1. An instrument for determining functional areas for any plane figure about a base line comprising, a form having a base line scribed thereon, a line scribed thereon at an oblique angle thereto, and a curved boundary edge on said form having perpendicular heights from said base line at any point proportional to a power of the distance between said base and oblique lines in a line normal to said base line through said point.

2. An instrument for determining moments of inertia of any shape about a base line comprising, a form having a base line scribed thereon, a line scribed thereon at an oblique angle thereto, and a curved boundary edge on said form having perpendicular heights from said base line at any point proportional to the cube of the distance between said base and oblique lines in a line normal to said base line through said point.

3. An instrument for determining moments of inertia of any shape about a base line comprising, a form having scribed thereon a base line, a line scribed thereon at an oblique angle thereto, and a curved boundary edge on said form each point of which is distant from said base line by a length proportional to one-third the cube of the distance between said base and oblique lines in a line normal to said base line through said point.

4. An instrument for determining moments of inertia of any shape about a base line comprising, a form having scribed thereon a base line, a line scribed thereon at an oblique angle thereto and a curved boundary edge on said form each point of which is distant from said base line by a length equal to a constant multiplied by a power of the distance between said base and oblique lines in a line normal to said base line through said point.

5. An instrument for laying out functional areas for any plane figure comprising a transparent sheet having a base line and lines normal thereto, each normal line having a reference point thereon, and terminating at a boundary of said sheet at a point proportional to a power of the distance between the base line and the reference point.

6. An instrument for laying out moment of inertia areas comprising a transparent sheet having a base line and lines normal thereto, each normal line having a reference point thereon, and terminating at a boundary of said sheet at a point equal to a constant multiplied by the cube of the distance between the base line and the reference point.

7. An instrument for laying out moment of inertia areas comprising a transparent sheet having a base line and a plurality of lines normal thereto, each normal line having a reference point thereon, the reference points of succeeding normal lines arranged progressively further from the base line, each normal line continuing from the base line through its reference point to an indicating point, and each said indicating point being located a distance from said base line equal to a constant multiplied by the cube of the distance between the base line and the reference point.

WALTER NORMAN STONE.